United States Patent [19]

Bock et al.

[11] Patent Number: 4,938,877

[45] Date of Patent: Jul. 3, 1990

[54] UNIQUE AND EFFECTIVE SEPARATION TECHNIQUE FOR OIL CONTAMINATED SLUDGE

[75] Inventors: Jan Bock, Bridgewater; Max L. Robbins, South Orange; Gerard P. Canevari, Cranford, all of N.J.

[73] Assignee: Exxon Research and Engineering Company, Florham Park, N.J.

[21] Appl. No.: 309,632

[22] Filed: Feb. 13, 1989

[51] Int. Cl.⁵ ............................................ B01D 17/00
[52] U.S. Cl. ..................................... 210/723; 210/732
[58] Field of Search ................................ 166/273–275; 252/8.551, 8.554; 210/702, 708, 723, 724, 725, 728, 729, 732

[56] References Cited

U.S. PATENT DOCUMENTS 3,920,073 11/1975 Holm ................................... 166/275

Primary Examiner—Frank Sever
Attorney, Agent, or Firm—Richard E. Nanfeldt

[57] ABSTRACT

The present invention relates to a method for separating water and oil from a sludge which contains water, oil and solids which method comprises (1) contacting the sludge with an effective amount of 1 or more surfactants chosen and balanced to form certain types of microemulsions with equal volumes of decane and 3% aqueous NaCl, (2) mixing said surfactants and sludge with sufficient agitation to obtain a uniform mixture, (3) allowing said mixture to stand under gravitational settling or centrifugation to obtain the separation from the bottom sediment of an aqueous phase which may contain solubilized oil with or without an additional floating oil phase, (4) decanting separately the oil and aqueous phases and (5) further treating the aqueous phase with heat and/or NaCl to separate the solubilized oil or further treating the bottom sediment with selected surfactants to release adhering oil.

20 Claims, No Drawings

UNIQUE AND EFFECTIVE SEPARATION TECHNIQUE FOR OIL CONTAMINATED SLUDGE

FIELD OF THE INVENTION

The present invention relates to the separation of water and/or oil from a sludge mixture of water, oil and solids by the use of specific surfactants. The selection of these surfactants is based on their phase behavior when formulated in microemulsions.

BACKGROUND

The disposal of large volumes of refinerygenerated oily sludge is a costly operation. The destabilization of this sludge to separate the oil, water, and solid phases would greatly reduce the volume for disposal and would represent significant oil recovery. The objective of this invention is to destabilize the sludge by the application of microemulsion technology.

Microemulsions are translucent or transparent, thermodynamically stable mixtures of an oil, an aqueous phase and one or more surfactants chosen to impart certain phase behavior characteristics. Unsaturated, single phase microemulsions will spontaneously imbibe more oil and/or water until they become saturated. Microemulsions saturated with oil exist as a lower water-continuous microemulsion containing essentially all the surfactants in equilibrium with an excess oil phase on top. Microemulsions saturated with water exist as an upper oil-continuous microemulsion containing essentially all the surfactants in equilibrium with an excess aqueous phase. Microemulsions saturated with both oil and water exist as a middle bicontinuous microemulsion in equilibrium with both excess oil and aqueous phase. Interfacial tensions between saturated microemulsions and excess oil and/or aqueous phases are ultra-low, often less than 0.01 dyne/cm. The relative amounts of oil and water held in saturated microemulsions depends on oil and aqueous phase compositions, temperature and the hydrophilic vs. lipophilic tendencies of the surfactant blend.

The surfactant HLB (hydrophilic-lipophilic balance) is one way of defining the hydrophilic vs lipophilic tendencies of the surfactant in water and Nujol mixtures at room temperature. A better way which takes account of variations in temperature and aqueous and oil phase compositions is microemulsion phase behavior. Hydrophilic surfactants form lower phase microemulsions with the given oil and aqueous phase; lipophilic surfactants form upper phase microemulsions. Mixtures of hydrophilic and lipophilic surfactants can form middle phase microemulsions when their ratio is properly adjusted. The relative amounts of oil and water in middle phase microemulsions at a given temperature depends on the weight ratio of hydrophilic/lipophilic surfactants (H/L ratio). When the H/L ratio is so adjusted that the microemulsion contains equal amounts of water and oil, the microemulsion is said to be balanced and the surfactants are at balance for the given temperature and aqueous and oil compositions. The absolute amount of water and oil at balance is a measure of surfactant efficiency i.e. solubilizing power.

We have discovered that a surfactant blend which forms an upper phase microemulsion when contacted with refinery sludge containing oil, water and solids breaks the sludge and sheds water leaving a residue of oily solids. Likewise, a surfactant blend which forms a lower phase microemulsion causes oil to be shed from refinery sludge leaving a residue of solids with much reduced oil content. The oil which is shed from the sludge remains dispersed in the aqueous phase as a water-continuous microemulsion and/or forms a separate oil phase floating on top. Surfactant blends forming middle phase microemulsions cause both oil and water to be shed from refinery sludge.

In an alternate embodiment of the invention of using microemulsion phase behavior to formulate surfactants for breaking refinery sludge, unsaturated water-continuous microemulsions extract water causing oil and solids to separate from the sludge. With proper choice of surfactant, the extracted water may be separated from the microemulsion by heating the microemulsion thus restoring the water-continuous microemulsion to its unsaturated condition. The remaining oily solids are than contacted with an unsaturated oil-continuous microemulsion which extracts oil from the solids. Temperature adjustment allows the separation from the microemulsion of the extracted oil.

SUMMARY OF THE INVENTION

The present invention relates to a process for the separation of water and/or oil from a sludge which contains oil, water and solids. The process comprises mixing an effective amount of one or more surfactants with the sludge and letting the mixture stand until it separates into an upper oil layer and/or a water layer and a bottom sediment layer. The surfactant(s) are chosen depending on the relative oil/water content of the sludge. For a relatively high oil content (>10% oil), a hydrophilic surfactant(s) is selected to deoil the sludge such that the sludge separates into an upper oil layer and lower water and solids layer(s). The water layer may contain solubilized oil. A hydrophilic surfactant in this context is defined as one which forms a lower phase microemulsion with the oil and aqueous phase present in the sludge. For a relatively low oil content sludge (<4% oil), a lipophilic surfactant(s) is chosen to dewater the sludge such that the sludge separates into an upper aqueous layer which may contain some solubilized oil and a bottom oily solids layer. A lipophilic surfactant in this context is defined as one which forms an upper phase microemulsion with the oil and aqueous phase present in the sludge. The bottom oily solids layer may be separated and treated additionally with a hydrophilic surfactant(s) or a lower phase microemulsion as above to recover the oil.

For sludges in the range of 2 to 10% oil content, both lipophilic and hydrophilic surfactants are effective though their mode of action differs. Both cause the sludge to shed an aqueous supernatant phase. However, with hydrophilic surfactants the supernatant phase is rich in solubilized oil while the bottom sediment is lean in oil. With lipophilic surfactants the supernatant phase is lean in oil while oil concentrates in the bottom sediment.

In preferred embodiments of the present invention the surfactants are selected from one or both of;

(a) an alkali metal, ammonium, alkyl ammonium, alkanol ammonium or ethoxylated alkyl or alkanol ammonium salt of an alkyl or alkyl aryl sulfonic acid of the generic formula:

$$R-SO_3H$$

wherein R is an alkyl or alkyl benzene group containing 8 to 30 carbon atoms in the alkyl chain and the benzene ring may be additionally substituted with one or two alkyl groups containing 1–3 carbon atoms each and (b) an ethoxylated surfactant of the generic formula:

$$R_1X(CH_2CH_2O)_n Y$$

wherein $R_1$ is an alkyl or mono-or di-alkyl aryl group containing 8 to 30 carbon atoms, X is —O—, —S—,

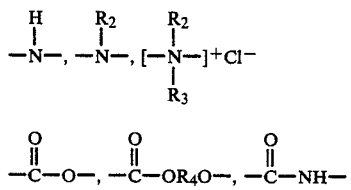

—SO$_2$NH— Y is —H, —SO$_3^-$M$^+$ or —(PO$_3$H)—M$^+$ *wherein M+ is an inorganic on ammonium cation including alkyl substituted ammonium cations*; $R_2$ is an alkyl group containing 1 to 20 carbon atoms or a polyethoxy ether group containing from to 30 (CH$_2$CH$_2$O) groups; $R_3$ is H or an alkyl group containing 1 to 3 carbon atoms; $R_4$ is a poly hydroxy group derived from glycerol, glycols, sorbitol, or various sugars; and n is an integer from 1 to 30.

In other preferred embodiments of the present invention the surfactant(s) is dissolved in a hydrocarbon solvent which may contain a cosolvent selected from the group consisting of alkylene glycol monoalkyl ethers and $C_2$ to $C_5$ alkanols.

In yet other preferred embodiments of the present invention the surfactant blend contains one or more of (i) the sodium or monoethanol amine salt of $C_{12}$-0-xylene sulfonic acid, and (ii) an ethoxylated dinonyl phenol containing 9 moles of ethylene oxide per mole of surfactant.

In a most preferred embodiment of the present invention the surfactant blend contains one or more of the ethoxylated alkyl ammonium salts of alkyl aryl sulfonic acids containing two to twenty ethylene oxide groups per molecule.

DETAILED DESCRIPTION

For the process of separating oil from a relatively high oil content sludge (>10% oil), an effective amount of a hydrophilic surfactant(s) is mixed with the sludge using sufficient agitation to form a uniform mixture. The effective amount will vary with the composition of the sludge to be treated and is within the skill of one having ordinary skill in the art to determine. The determination of an effective amount is illustrated in the examples cited below. The surfactant-sludge mixture is allowed to stand until separate layers of oil, water and solids are formed wherein the upper most layer is oil, the middle layer is water which may contain solubilized oil and the bottom layer is solids. (In some cases the water and oil or the water and solids combine to form a single layer). The oil, water and solids layers are then separated by decantation. The oil is recycled as a refinery stream, the water is discharged with or without additional waste water treatment and the solids are used as land fill.

The hydrophilic surfactant(s) for purposes of this invention is defined as one or more surfactants in combination having the properties of providing, at 1.5 wt % concentration in equal volumes of decane and 3 wt % aqueous NaCl, a lower phase microemulsion at 20° C. such that the volume ratio of oil to surfactant (Vo/Vs) in the microemulsion phase is at least 0.5, preferably greater than 1 and most preferably greater than 2. The term "lower phase" microemulsion is descriptive in context since it means that the aforementioned system consisting of the hydrophilic surfactant and equal volumes of oil and water separates into an aqueous lower phase containing most of the surfactant in equilibrium with an excess oil phase which is essentially surfactant-free.

The hydrophilic surfactant which is defined by the above properties includes, but is not limited to the alkyl and alkylaryl sulfonic acid salts wherein the alkyl group is a $C_9$ to $C_{18}$ linear, branched, or bilinear structure; the aryl group is selected from benzene, toluene, orthoxylene, and naphthalene; and the salt is a salt of an alkali metal or alkanol amine. Also included, and preferred are the ethoxylated alkylphenols. Most preferred are the ethoxylated $C_{12}$–$C_{18}$ alkyl ammonium salts of $C_9$–$C_{24}$ alkyl and alkylaryl sulfonic acids containing 6 or more ethylene oxide (hereinafter EO) groups, wherein the alkyl and aryl groups are as previously defined above.

Representative examples of hydrophilic alkyl and alkylaryl sulfonic acid salts include monoethanol ammonium nonyl o-xylene sulfonate, sodium dodecyl benzene sulfonate, ammonium tetradecyl benzene sulfonate, diethanol ammonium hexadecyl benzene sulfonate, and sodium dodecyl naphthalene sulfonate. Preferred hydrophilic sulfonic acid salts include heptaethoxy octadecyl ammonium dodecyl o-xylene sulfonate (designated $C_{12}$XS-Et7) and decaethoxy octadecyl ammonium dodecyl ortho xylene sulfonate (designated $C_{12}$XS-Et10). The ethoxylated alkyl amines used in preparing the ethoxylated alkyl ammonium salts of alkyl aryl sulfonic acid can be obtained from Akzo Chemie America under the trade name Ethomeens ® or from Exxon Chemical-Tomah Products.

Representative hydrophilic ethoxylated alkyl phenols include Igepal ® DM 710, Igepal ® DM 730 and Igepal ® DM880 available from GAF which are chemically di-nonyl phenols ethoxylated with 15, 24 and 49 moles of EO, respectively. Preferred is Igepal ® DM 530 which is dinonyl phenol ethoxylated with 9 moles of ethylene oxide. Other suitable ethoxylated alkyl phenols include Tritons ® X100, X102 and X114 available from Rohm and Haas of Philadelphia, PA and Igepals CO 610, 630, 660, 710, 720, 730, 850 and 880 which are chemically mono-octyl or nonyl phenols ethoxylated with from 8 to 30 moles of EO.

The hydrophilic surfactant(s) is delivered to the sludge neat or dissolved in a suitable solvent to reduce viscosity and facilitate mixing. A hydrocarbon liquid (oil) acts as a solvent for the blend of surfactants. The hydrocarbon liquid, which may be comprised of one or more hydrocarbon oils, is selected such that (1) they are miscible with the sludge oil and (2) the surfactants are soluble in, or miscible with the hydrocarbon liquid, which hydrocarbon liquid may also contain water. For example, it may be beneficial to add up to about 10 wt % water to improve the solubility of the surfactants in the hydrocarbon oil. Non-limiting examples of hydrocarbons suitable for use include Isopar ® M, No. 2 diesel fuel oil, kerosene, naphthas, white oil, and the like. The hydrocarbon oil is used in an effective amount, that is, an amount such that the viscosity of the blend of surfactants and hydrocarbon oil is such that it may be easily mixed with the sludge. The effective amount of course will vary depending upon the technique used to apply the surfactant blend to the sludge and is within the skill of one having ordinary skill in the art to determine.

Under certain circumstances, up to 50, generally 10 to 25, weight percent of a cosolvent is included in the solvent to improve the solubility and reduce the viscosity of the surfactant in the hydrocarbon medium. The cosolvents are of the class of alkylene glycol monoalkyl ethers, $C_2$ to $C_5$ alkanols and mixtures thereof. Representative cosolvents include ethers such as ethylene glycol monopropyl ether, ethylene glycol monoethyl ether, ethylene glycol monomethyl ether, ethylene glycol monobutyl ether, diethylene glycol monomethyl ether, diethylene glycol monomethyl ether, diethylene glycol n-butyl ether, propylene glycol monomethyl ether, dipropylene glycol monomethyl ether and tripropylene glycol monomethyl ether, and alkanols which include straight and branched chain members such as ethanol, propanol, butanol, and pentanol. Of the alkanols, tertiary amyl alcohol (TAA) is preferred. Of the ethers, ethylene glycol monobutyl ether is preferred. It is understood, where appropriate some of the above cosolvents can be used in place of the hydrocarbon solvent. Non-limiting examples of the more preferred cosolvents which can be used in place of the hydrocarbon solvent include: ethylene glycol mono butyl ether, ethylene glycol mono ethyl ether, diethylene glycol mono ethyl ether and diethylene glycol mono butyl ether. It is understood that when using a cosolvent, the ratio of the surfactants may have to be readjusted for changes in phase behavior brought about by the addition of the cosolvent.

For the process of separating water from a relatively low oil content sludge (< 4% oil), an effective amount of a lipophilic surfactant(s) is mixed with the sludge using sufficient agitation to form a uniform mixture The surfactant-sludge mixture is allowed to stand until separate layers of water which may contain some solubilized oil and sediment are formed wherein the upper layer is water and the bottom sediment is a mixture of oil and solids. Water is decanted and discharged with or without additional waste water treatment. The bottom sediment is used as land fill if the oil content is sufficiently low. If appreciable oil is present in the sediment (> 1%), the solids may be contacted with the hydrophilic surfactant(s) used for deoiling as described above or an aqueous solution or lower phase microemulsion made with the aforementioned hydrophilic surfactants. The separated oil is then recycled as a refinery stream. The lipophilic surfactant(s) is delivered to the sludge neat or dissolved in a suitable solvent as described above.

The lipophilic surfactant for purposes of this invention is a surfactant having the properties of providing, at 1.5 wt % concentration in equal volumes of decane and 3% aqueous NaCl, an upper phase microemulsion at 20° C. such that the volume ratio of water to surfactant (Vw/Vs) in the microemulsion phase is at least 0.5, preferably greater than 1 and most preferably greater than 2. The term "upper phase" microemulsion as used in defining the lipophilic surfactant ingredient means that the system consisting of the surfactant in equal volumes of oil and water separates into a surfactant-containing oil upper phase in equilibrium with an excess aqueous phase which is essentially surfactant-free.

The lipophile having been defined by the above properties includes, but is not limited to, the ethoxylated alkyl phenols. Also included, and preferred, are the alkyl and alkylaryl sulfonic acid salts wherein the alkyl group is a $C_{12}$ to $C_{24}$ linear, branched, or bilinear structure; the aryl group is selected from benzene, toluene, orthoxylene, and naphthalene; and the salt is a salt of an alkali metal or alkanol amine. More preferred are the ethoxylated $C_{12}$-$C_{18}$ alkyl ammonium salts of $C_9$-$C_{24}$ alkyl and alkylaryl sulfonic acids containing less than six EO groups wherein the alkyl and aryl groups are as previously defined above.

Representative examples of lipophilic alkyl aryl sulfonates include monoethanol ammonium dodecyl o-xylene sulfonate, sodium tetradecyl o-xylene sulfonate, sodium hexadecyl o-xylene sulfonate, diethanol ammonium pentadecyl o-xylene sulfonate, triethanol ammonium octadecyl o-xylene sulfonate (prepared from penta and hexa propylene), sodium octapropylene benzene sulfonate, sodium tetracosyl toluene sulfonate, and various high molecular weight petroleum sulfonates. Preferred are the sodium and monoethanol ammonium salts of dodecyl o-xylene sulfonic acid. Most preferred are di-and penta ethoxy octadecyl ammonium dodecyl o-xylene sulfonate designated $C_{12}XS$-Et2 and $C_{12}XS$-Et5 respectively.

Representative lipophilic ethoxylated alkyl phenols include Igepals ® CO 210 and CO 430 which are nonyl phenols containing 1.5 and 4 moles of EO respectively, and Tritons ® X15 and X35 which are octyl phenols containing 1 and 3 moles of EO, respectively.

The present invention is not confined to the use of the aforementioned ethoxylated alkyl phenols but includes other ethoxylated surfactants of the generic formula:

$$R_1X(CH_2CH_2O)_n Y$$

wherein $R_1$ is an alkyl or mono or di-alkyl aryl group containing 8 to 30 carbon atoms; X is —O—, —S—,

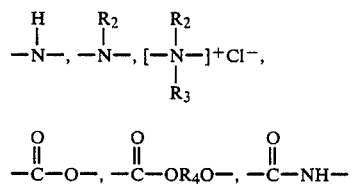

or —SO$_2$NH—;
Y is —H—, —SO$_3$—M$^{30}$ or —(PO$_3$H)·M$^+$ wherein M+ is an inorganic or ammonium cation including alkyl substituted ammonium cations; $R_2$ is an alkyl group containing 1 to 20 carbon atoms or a polyethoxy ether group containing from 1 to 30 ($CH_2CH_2O$) groups; $R_3$ is H or an alkyl group containing 1 to 3 carbon atoms; $R_4$ is a polyhydroxy group derived from glycerol, glycols, sorbitol, or various sugars; and, n is an integer of from 1 to 30.

The above ethoxylated alkyl phenols may be blended with an alkali metal, ammonium, alkyl ammonium, alkanol ammonium or ethoxylated alkanol ammonium salt of an alkyl or alkyl aryl sulfonic acid of the generic formula:

$$R—SO_3H$$

wherein R is an alkyl or alkyl benzene group containing 8-30 carbon atoms in the alkyl chain and the benzene ring may be additionally substituted with one or two alkyl groups containing 1-3 carbon atoms each. Preferred blends of ethoxylated alkyl phenols with alkyl aryl sulfonates include combinations of Igepal ® DM530 or Igepal ® DM 710 with the sodium or monoethanol amine salt of $C_{12}$ o-xylene sulfonic acid.

Alternatively, ethoxylated alkyl ammonium (Ethomeen) ® salts of the above alkylaryl sulfonic acids containing varying degrees of ethoxylation are blended. Preferred blends of ethoxylated alkyl ammonium salts of alkylaryl sulfonic acids include pentaethoxy octadecyl ammonium dodecyl benzene sulfonate combined with heptaethoxy octadecyl ammonium dodecyl benzene sulfonate and diethoxy cocoa ammonium dodecyl o-xylene sulfonate with decaethoxy octadecyl ammonium dodecyl o-xylene sulfonate. Most preferred is the blend of pentaethoxy octadecyl ammonium dodecyl o-xylene sulfonate with hepta or deca ethoxy octadecyl ammonium dodecyl o-xylene sulfonate, i.e., a blend of $C_{12}XS$-Et5 with $C_{12}XS$-Et10.

For sludges in the range of 2 to 10% oil content, both lipophilic and hydrophilic surfactants are effective though their mode of action differs. Both cause the sludge to shed an aqueous supernatant phase. However, with hydrophilic surfactants the supernatant phase is rich in solubilized oil while the bottom sediment is lean in oil. In this case with proper choice of surfactants the supernatant phase after separation can be heated or contacted with NaCl to drive the system to an upper phase microemulsion so that water separates out and oil and surfactants concentrate in the upper phase. This upper phase is then separated and recycled as a refinery stream while the water is discharged. Ethoxylated surfactants are suitable for this purpose.

With lipophilic surfactants, the supernatant aqueous phase obtained after contacting the sludge is lean in oil while oil concentrates in the bottom sediment. Under these circumstances, after decanting the supernatant, the sediment may be contacted with the hydrophilic surfactant(s) used for deoiling as described above or an aqueous solution or water-continuous microemulsion made with the aforementioned hydrophilic surfactants. The separated oil is then recycled as a refinery stream.

Under circumstances as required by variation in sludge oil composition and content or aqueous phase composition, it is often beneficial to blend the aforementioned hydrophilic and lipophilic surfactants. The wt. ratio of hydrophile/lipophile (H/L ratio) can thus be adjusted (balanced) to accommodate variations in sludge composition.

DESCRIPTION OF THE PREFERRED EMBODIMENTS

The following examples will demonstrate the invention and show the critical nature of adjusting H/L ratio to accommodate sludge oil and water content and composition. It is understood that these examples in no way serve to limit the true scope of this invention, but rather, are presented for illustrative purposes.

Example 1

Dewatering Low Oil-Content BW Refinery Separator Bottoms Sludge

Analysis: water (Dean Stark) = 84 wt %, Solids (Evaporation) = 12, Oil (Mass Balance) = 4, Aqueous Salinity = 0.8% NaCl.

The surfactant system selected was based on the surfactants obtained by neutralizing $C_{12}$ o-xylene sulfonic acid with a $C_{18}$ ethoxylated amine supplied by Akzo Chemie America under the trade name Ethomeen ®. This system was found to have high uptake (large amounts of water and oil solubilized) in previous studies. These surfactants will be referred to as $C_{12}XS$-Etn where n denoted the number of ethylene oxide (EO) groups per molecule. As discussed previously, $C_{12}XS$-Etn surfactants with n<6 are considered lipophilic surfactants while those with n≧6 are considered hydrophilic surfactants. Blends of lipophilic with hydrophilic $C_{12}XS$-Etn are treated as having an intermediate EO content. The surfactants used in this example are blends of $C_{12}XS$-Et5 with $C_{12}XS$-Et10. These surfactants were delivered neat or dissolved in toluene or isopropanol as 50% solutions for ease of mixing. The surfactant solutions were added at the desired surfactant concentration to 50 ml of BW Refinery sludge in a 100 ml graduate. The mixture was shaken 30 times and allowed to stand 23 hrs at room temperature. The volume and color of water which separated was noted and recorded in Table I. These data show that (1) Low oil content sludge containing oil bound to solids can be dewatered using critically balanced blends of lipophilic and hydrophilic surfactants. For the preferred surfactants, $C_{12}XS$-Et5/$C_{12}XS$-Et10, delivered in toluene solutions the best ratio is 33/67. The data demonstrate the critical nature of surfactant selection for a particular sludge.

(2) The critical dependence of water separation on H/L ratio is reduced when the surfactants are delivered neat. The range of effective H/L ratios is broadened to include ratios from 50/50 to 0/100.

(3) A surfactant concn. of ~3% is optimum for this sludge. Using 5% surfactant has little added effect while 1% has virtually no effect. Thus an effective amount of surfactant to treat this sludge would be in the range 2-4%

(4) Surfactant delivery in isopropanol solution gave results comparable to delivery in toluene solution.

(5) The surfactants were moderately effective in removing ~30% of the water from this particular sludge.

EXAMPLE 2

Deoiling High Oil Content BR Refinery API Separator Bottoms

Estimate: water=48 vol %, solids=40, Oil 12.

$C_{12}XS$-Etn surfactants were contacted neat at the desired concentration with BR refinery API Separator sludge using a procedure similar to that of Example 1. The volume percent of separated phases was measured after 1-3 weeks storage at room temperature and recorded in Table II. These data show that (1) High oil content sludge containing free oil (see photomicrograph) can be dewatered and deoiled using a hydrophilic surfactant or surfactant blend. The hydrophilic surfactant, $C_{12}XS$-Et10, is best in the illustrated application. The data demonstrate the critical nature of surfactant selection for a particular sludge.

(2) $C_{12}XS$-Et10 was highly effective in separating both oil and water from this particular sludge. Phase separation was estimated to be complete.

(3) A surfactant concentration of ~1% is optimum for this sludge. Using 3% surfactant had no advantage and possibly a debit. A concentration of 0.5% was not as effective in deoiling the sludge. An effective amount of surfactant for this sludge is from 0.5 to 3%.

EXAMPLE 3

Dewatering Santa Ynez Treater Bottoms

Analysis: 30% Treater Bottoms, 70% Produced Water, Water: 82%, Solids: 12%, Oil: 6%.

The $C_{12}XS$-Etn surfactants were delivered neat at the desired surfactant concentration to a 50 ml sample of sludge in a 100 ml graduate. The sludge consisted of 30% Santa Yuez Treater Bottoms which analyzed: 40% water, 40% solids and 20% oil. The Treater Bottoms were cut back with 70% produced water which was essentially free of oil and solids. The surfactant sludge mixture was shaken and allowed to stand at room temperature. The volume of water which separated after 2 hrs was noted and recorded in Table III. These data show that (1) Low oil content sludge can be rapidly dewatered (<2hrs) by a lipophilic surfactant with critically adjusted H/L properties. For the preferred surfactants, $C_{12}XS$-Et5 provides the best balance of H/L properties.

(2) Comparison with Table I shows that choice of the best surfactant depends on the specific sludge composition. Santa Yuez sludge requires a more lipophilic surfactant than BW refinery sludge.

(3) There is no performance advantage in using higher than 1% surfactant on this sludge. Obviously, the lower the surfactant concentration the better for economic reasons.

EXAMPLE 4

Dewatering BR Refinery Dirty Master Separator (DMS) Sludge

The $C_{12}XS$-Etn surfactants were contacted at the desired concentration with BR refinery Dirty Master Separator Sludge using a procedure similar to that of Example 1. The volume percent of separated water was measured after approximately 18 hours storage at room temperature and recorded in Table IV. These data show that (1) The composition of this sludge is highly variable depending on when the sample was taken. This makes surfactant selection very critical.

(2) Moderately low oil content sludge (~4–5% oil) can be dewatered by both lipophilic and hydrophilic surfactants. In excess of 75% of the water present can be separated. However the amount of solubilized oil present in the water phase depends strongly on the hydrophilic vs lipophilic properties of the surfactant. With $C_{12}XS$-Et10, more oil is released from the sludge and solubilized in the aqueous phase than with $C_{12}XS$-Et5. This is evidenced by the blackness of the aqueous phase with $C_{12}XS$-Et10. This observation is confirmed by the analyses data in Example 5.

(3) With a low oil content sample (10/31/88), $C_{12}XS$-Et5 provides effective dewatering at concentrations as low as 0.2 wt %

EXAMPLE 5

Analysis of Surfactant-Treated BR Refinery DMS Sludge

Test and Analytical Procedures

Larger samples of sludge were treated with surfactant in 250 ml and 500 ml graduates so that the sediment and supernatant phases of the treated sludge could be accurately analyzed to quantify the performance of the microemulsion surfactants. For these larger samples the surfactant was mixed with the sludge by use of a Waring Blender for 30 seconds. The water content of the total sludge before treatment and water in the sediment phase of the treated sludge were determined by distillation and collection and measurement of the distilled water. The oil content of the total sludge, treated sediment and supernatant samples was determined by extracting the oil from the test samples by a Freon solvent. The Freon was then evaporated and the remaining oil was weighed. The method is referred to as "Gravimetric". The solids content is determined by washing/dissolving the oil from a water-free sludge sample by a toluene solvent. The remaining solids are then weighed and referred to as "Toluene Insoluble Solids".

These data (see Table V) confirm that (1) Moderately low oil content sludge (10/21/88 sample) is effectively dewatered by both hydrophilic ($C_{12}XS$-Et10) and lipophilic ($C_{12}XS$-Et5) surfactants. More than 75% of the water in the sludge is shed as a separate phase.

(2) With $C_{12}XS$-Et5 virtually all the oil concentrates in the sediment layer as evidenced by the extremely low average oil content (~0.05%) in the supernatant aqueous phase and high average oil concentration (~16%) in the sediment.

(3) This mode of action is confirmed even with very low oil content sludge (11/3/88 sample).

(4) With $C_{12}XS$-Et10, the solids are effectively de-oiled and most of the oil concentrates in the supernatant aqueous phase. Thus by careful adjustment of the hydrophilic vs. lipophilic properties of the surfactant the oil can be made to concentrate either in the sediment or the supernatant aqueous phase either of which can be further treated to recover the oil.

TABLE I

| | Dewatering Low Oil Content Bayway Sludge | | | | | |
|---|---|---|---|---|---|---|
| Surfactant Conc. | Vol.(ml) of Separated H$_2$O After 23 Hrs for $C_{12}XS$-Et5/$C_{12}XS$-Et10 Ratio = | | | | | |
| wt % | 100/0 | 67/33 | 50/50 | 33/67 | 0/100 | Control |
| 1[1] | 0 | 0 | 1(cl)* | 2(cl) | 0 | 0 |
| 3[1] | 0 | 2(cl) | 4(cl) | 12(br)* | 0 | 0 |
| 5[1] | 2(cl) | 2(cl) | 4(cl) | 13(cl) | 0 | 0 |
| 3[2] | 3(cl) | | 11(tb)* | 11(tb) | 12(tb) | 0 |
| 5[2] | 3(cl) | | 10(br) | 13(tb) | 13(tb) | 0 |
| 1[3] | 0 | 0 | 0 | 0 | 0 | 0 |
| 3[3] | 0 | 7(br) | 12 | 10(tn)* | 7(tn) | 0 |
| 5[3] | 0 | 5(cl) | 0 | 12(tn) | 8(tn) | 0 |

*cl: clear br: brown tb: turbid tn: tan
[1]Delivered in 50% toluene soln.
[2]Delivered neat
[3]Delivered in 50% ispropanol

TABLE II

| | Deoiling High Oil Content Baton Rouge API Separator Bottoms | | | | | | |
|---|---|---|---|---|---|---|---|
| Surfactant Concn. | Vol.(ml) Separated on 1–3 Wk. Storage at Room Temp. for $C_{12}XS$-Etn | | | | | | |
| wt % | Separated Phase | Et5 | Et5/Et10 | Et10 | Et5/Et15 | Et10/Et12 | Et15 | Control |
| 3 | Oil | 0 | 5 | 12 | 0 | 0 | 0 |

TABLE II-continued

Deoiling High Oil Content Baton Rouge API Separator Bottoms
Vol.(ml) Separated on 1-3 Wk. Storage at Room Temp. for $C_{12}XS$-Etn

| Surfactant Concn. wt % | Separated Phase | Et5 | Et5/Et10 | Et10 | Et5/E15 | Et10/Et12 | Et15 | Control |
|---|---|---|---|---|---|---|---|---|
| 1 | Water | 0 | 17 | 46 | | 30 | 30 | 22 |
|  | Sediment | 100 | 78 | 42 | | 70 | 70 | 78 |
|  | Oil | | | 4 | 4 | 0 | | |
|  | Water | | | 45 | 44(bl)* | 30 | | |
|  | Sediment | | | 41 | 52 | 70 | | |
| 0.5 | Oil | | | 6 | | | | |
|  | Water | | | 44 | | | | |
|  | Sediment | | | 50 | | | | |

*bl: black

TABLE III

Dewatering Santa Ynez Treater Bottoms
Vol.(ml) of Separated Water after 2 hours for $C_{12}XS$-Etn

| Surfactant Concn. wt % | $C_{12}XS$-Et2 | $C_{12}XS$-Et5 | $C_{12}XS$-Et10 | $C_{12}Et$-15 | Control |
|---|---|---|---|---|---|
| 1 | 0 | 25(tb)* | 0 | 0 | 0 |
| 3 | — | 20(tb) | 0 | — | 0 |

*tb: turbide

TABLE IV

Dewatering Baton Rouge Dirty Master Separator (DMS) Sludge
Vol % Separated $H_2O$ After 18 hrs. for $C_{12}XS$-Etn

| Sludge Sample | Sludge Analysis W | S | O | Concn. wt % | Et5 | Et5 + Et10[1] | Et10 | Et5 + Et15[1] | Et15 | Control |
|---|---|---|---|---|---|---|---|---|---|---|
| 9/13/88 | 90 | ~5 | ~5 | 2 | 70(gr)[2] | 64(gr) | 74(bl)[2] | 72(bl) | 70(bl) | 0 |
| 10/21/88 | 88.7* | 7.0* | 4.3* | 2 | 75(gr)* | 76(tb)[2] | 84(bl) | 86(bl)[3] | 100(bl)[4] | 0 |
| 10/31/88 | 97.8 | 1.7 | 0.55 | 2 | 44(gr) | | | | | |
|  |  |  |  | 1 | 42 | | | | | |
|  |  |  |  | 0.4 | 44 | | | | | |
|  |  |  |  | 0.2 | 44 | | | | | |
|  |  |  |  | 0.1 | 32 | | | | | |

*Average of 2 runs
[1]Equal weights
[2]gr = gray bl = black tb = turbid
[3]Includes 14% floating emulsion
[4]Includes sediment and 18% floating emulsion; sediment interface hard to see

TABLE V

Analysis of Surfactant-Treated Baton Rouge DMS Sludge

| | Surfactant | Total Sludge % O | % W | % S | Vol (ml) | Supernatant Liquid % O | % W | % S | Vol (ml) | Sediment % O | % W | % S | Vol (ml) |
|---|---|---|---|---|---|---|---|---|---|---|---|---|---|
| 88 | $C_{12}XS$-Et5 | 4.3* | 88.7* | 7.0* | 250 | 0.09 | 99.9 | — | 194 | 18.4 | 50.3 | (31.3) | 56 |
| 88 | $C_{12}XS$-Et5 | 4.3* | 88.7* | 7.0* | 250 | 0.02 | 100.0 | — | 182 | 13.8 | 60.5 | (25.7) | 68 |
| 88 | $C_{12}XS$-Et10 | 4.3* | 88.7* | 7.0* | 250 | 11.1 | 88.9 | — | 210 | 0.48 | 55.7 | (43.8) | 40 |
| 88 | $C_{12}XS$-Et5 | 0.43 | 99.0 | 0.55 | 250 | 0.008 | 100.0 | 0.03 | 220 | 17.5 | 72.7 | 9.8 | 30 |
| 88 | $C_{12}XS$-Et10 | 2.3 | 95.1 | 2.6 | 400 | 4.21 | 95.5 | 0.34 | 330 | 4.0 | 81.9 | 14.1 | 70 |

TABLE VA

Analysis of Surfactant-Treated Baton Rouge API Separator #11 Sludge

| 88 | $C_{12}XS$-Et5 | 4.7 | 85.4 | 9.9 | 400 | 0.82 | 98.5 | 0.66 | 330 | 9.4 | 64.6 | 26.0 | 70 |

Average of 2 runs

What is claimed is:

1. A method for separating water and oil from a sludge which contains water, solids and more than 2% weight oil which comprises the steps of:
   (a) contacting the sludge with an effective amount of one or more hydrophilic surfactants in combination having the properties of providing, at 1.5 wt % concentration in equal volumes of decane and 3 wt % aqueous NaCl, a lower phase microemulsion such that the volume ratio of oil to surfactant in the microemulsion phase is at least 0.5 wherein said one or more surfactants is selected from the group consisting of an alkali metal, ammonium, alkyl ammonium, alkanol ammonium or ethoxylated alkyl or alkanol ammonium salt of an alkyl or alkylaryl sulfonic acid of the generic formula:

$$R-SO_3H$$

wherein R is alkyl or alkyl benzene group containing about 8 to about 30 carbon atoms in the alkyl chain and the benzene ring may be additionally substituted with one or two alkyl groups containing 1-3 carbon atoms each; and an ethoxylated surfactant of the generic formula:

$$R_1X(CH_2CH_2O)_nY$$

wherein $R_1$ is an alkyl or mono- or di-alkyl aryl group containing about 8 to about 30 carbon atoms, X is —O—, —S—,

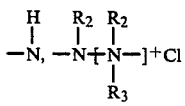

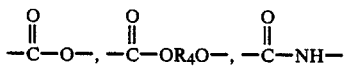

or —SO$_2$NH—; Y is —H, —SO$_3$—M$^+$ or —(PO$_3$-H)—M$^+$ wherein M$^+$ is an inorganic or ammonium cation including alkyl substituted ammonium cations; R$_2$ is an alkyl group containing about 1 to about 20 carbon atoms or a polyethoxy ether group containing from about 1 to about 30 (CH$_2$CH$_2$O) groups; R$_3$ is H or an alkyl group containing about 1 to about 3 carbon atoms; R$_4$ is a polyhydroxyl group derived from glycerol, glycols, sorbitol, or various sugars; and n is an integer from about 1 to about 30; and (b) mixing at least one said surfactant and said sludge with sufficient agitation to obtain a uniform mixture; and (c) allowing said mixture to stand under gravitational settling or centrifugation to obtain the formation of three layers; and (d) decanting separately the upper oil layer and the middle water layers from the bottom solid layer; and (e) further treating the water layer with heat and/or salt (NaCl) to separate the solubilized oil from the water.

2. The method of claim 1, wherein at least one of the surfactants is an ethoxylated C$_{12}$–C$_{18}$ alkyl ammonium salt of a C$_9$–C$_{24}$ alkyl or alkylaryl sulfonic acid containing 6 or more ethylene oxide groups.

3. The method of claim 1 wherein the surfactant(s) are dissolved in up to 50 wt % of a solvent comprised of one or more of a hydrocarbon liquid in which the surfactants are soluble; an oxygenated cosolvent; and less than about 10 wt. % water.

4. The method of claim 3, wherein the solvent is a hydrocarbon solvent selected from the group consisting of No. 2 diesel fuel oil, kerosene, and white oil.

5. The method of claim 3, wherein a cosolvent is present and the cosolvent is selected from the group consisting of one or more alkylene glycol monoalkyl ethers and C$_2$ and C$_5$ alcohols.

6. The method of claim 5, wherein the cosolvent is a tertiary amyl alcohol and is present in the range of about 10 to about 50 wt % based on the total weight of the solvents employed.

7. A method for separating water from a sludge which contains water, solids and less than 4% oil comprises the steps of:

(a) contacting the sludge with an effective amount of one or more lipophilic surfactants in combination having the properties of providing, at 1.5 wt % concentration in equal volumes of decane and 3 wt % aqueous NaCl, an upper phase microemulsion such that the volume ratio of water to surfactant in the microemulsion phase is at least 0.5, preferably greater than one and most preferably greater than two wherein said one or more surfactants is selected from the group consisting of an alkali metal, ammonium, alkyl ammonium, alkanol ammonium or ethoxylated alkyl or alkanol ammonium salt of an alkyl or alkylaryl sulfonic acid of the generic formula:

wherein R is alkyl or alkyl benzene group containing about 8 to about 30 carbon atoms in the alkyl chain and the benzene ring may be additionally substituted with one or two alkyl groups containing 1–3 carbon atoms each; and an ethoxylated surfactant of the generic formula:

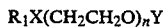

wherein R$_1$ is an alkyl or mono- or di-alkyl aryl group containing about 8 to about 30 carbon atoms, X is —O—, —S—,

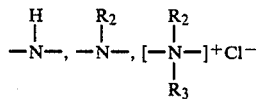

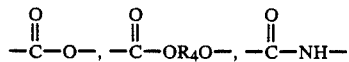

or —SO$_2$NH—; Y is —H, —SO$_3$—M$^+$ or —(PO$_3$-H)—M$^+$ wherein M$^+$ is an inorganic or ammonium cation including alkyl substituted ammonium cations; R$_2$ is an alkyl group containing about 1 to about 20 carbon atoms or a polyethoxy ether group containing from about 1 to about 30 (CH$_2$CH$_2$O) groups; R$_3$ is H or an alkyl group containing about 1 to about 3 carbon atoms; R$_4$ is a polyhydroxyl group derived from glycerol, glycols, sorbitol, or various sugars; and n is an integer from about 1 to about 30;

(b) mixing at least one said surfactant and said sludge with sufficient agitation to obtain a uniform mixture;

(c) allowing said mixture to stand under gravitational settling or centrifugation to obtain the separation from the bottom sediment of an aqueous phase;

(d) decanting the aqueous phase from the bottom sediment.

8. The method of claim 7, wherein the bottom sediment is further treated with an effective amount of 1 or more surfactants or an aqueous solution of 1 or more surfactants which in combination have the properties of providing, at 1.5 wt % concentration in equal volumes of decane and 3 wt % aqueous NaCl, a lower phase microemulsion such that the volume ratio of oil to surfactant in the microemulsion phase is at least 0.5, preferably greater than one and most preferable greater than two; and the aqueous phase is decanted after standing or centrifugation and further treated with heat and/or NaCl to separate the solubilized oil.

9. The method of claim 7, wherein at least one of the surfactants is an ethoxylated C$_{12}$–C$_{18}$ alkyl ammonium salt of a C$_9$–C$_{24}$ alkyl or alkylaryl sulfonic acid containing less than 6 ethylene oxide groups.

10. The method of claim 7, wherein the surfactant(s) are dissolved in up to 50 wt % of a solvent comprised of one or more of a hydrocarbon liquid in which the surfactants are soluble; an oxygenated solvent, less than about 10 wt % water.

11. The method of claim 10, wherein the solvent is a hydrocarbon solvent selected from the group consisting of No. 2 diesel fuel oil, kerosene, and white oil.

12. The method of claim 10, wherein a cosolvent is present and the cosolvent is selected from the group consisting of one or more alkylene glycol monoalkyl ethers and $C_2$ and $C_5$ alcohols.

13. The method of claim 12, wherein the cosolvent is tertiary amyl alcohol and is present in the range of about 10 to about 50 wt. % based on the total weight of the solvents employed.

14. A method for separating water and oil from a sludge which contains water, solids and oil which method comprises the steps of:

(a) contacting the sludge with an effective amount of a blend of at least one hydrophilic surfactants and at least one lipophilic surfactants so balanced that said blend at 1.5 wt % concentration forms in equal volumes of decane and 3 wt % aqueous NaCl a middle phase microemulsion such that the volume ratio of water and oil to surfactant, respectively, are at least 1, preferably greater than two and most preferably greater than four wherein said one or more surfactants is selected from the group consisting of an alkali metal, ammonium, alkyl ammonium, alkanol ammonium or ethoxylated alkyl or alkanol ammonium salt of an alkyl or alkylaryl sulfonic acid of the generic formula:

wherein R is alkyl or alkyl benzene group containing about 8 to about 30 carbon atoms in the alkyl chain and the benzene ring may be additionally substituted with one or two alkyl groups containing 1-3 carbon atoms each; and an ethoxylated surfactant of the generic formula: The method of claim 8, wherein at least one said surfactants is selected from the group consisting of: an alkali metal, ammonium alkyl or alkanol ammonium salt of an alkyl or alkylaryl sulfonic acid of the generic formula:

wherein R is an alkyl or alkyl benzene group containing about 8 to about 30 carbon atoms in the alkyl chain and the benzene ring may be additionally substituted with one or two alkyl groups containing 1-3 carbon atoms each, and an ethoxylated surfactant of the generic formula:

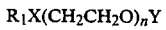

wherein $R_1$ is an alkyl or mono- or di-alkyl aryl group containing about 8 to about 30 carbon atoms, X is —O—, —S—,

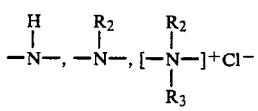

or —$SO_2NH$—; Y is —H, —$SO_3$—$M^+$ or —($PO_3$-H)—$M^+$ wherein $M^+$ is an inorganic or ammonium cation including alkyl substituted ammonium cations; $R_2$ is an alkyl group containing about 1 to about 20 carbon atoms or a polyethoxy ether group containing from about 1 to about 30 ($CH_2CH_2O$) groups; $R_3$ is H or an alkyl group containing about 1 to about 3 carbon atoms; $R_4$ is a polyhydroxyl group derived from glycerol, glycols, sorbitol, or various sugars; and n is an integer from about 1 to about 30.

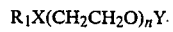

wherein $R_1$ is an alkyl or mono- or di-alkyl aryl group containing about 8 to about 30 carbon atoms, X is —O—, —S—,

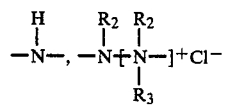

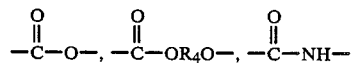

or —$SO_2NH$—; Y is —H, —$SO_3$—$M^+$ or —($PO_3$-H)—$M^+$ wherein $M^+$ is an inorganic or ammonium cation including alkyl substituted ammonium cations; $R_2$ is an alkyl group containing about 1 to about 20 carbon atoms or a polyethoxy ether group containing from about 1 to about 30 ($CH_2CH_2O$) groups; $R_3$ is H or an alkyl group containing about 1 to about 3 carbon atoms; $R_4$ is a polyhydroxyl group derived from glycerol, glycols, sorbitol, or various sugars; and n is an integer from about 1 to about 30;

(b) mixing said surfactant blend and said sludge with sufficient agitation to obtain a uniform mixture; and (c) allowing said mixture to stand under gravitational settling or centrifugation to obtain the separation from the bottom sediment of an aqueous phase containing solubilized oil with or without an additional floating oil phase; and (d) decanting separately the oil and aqueous phases; and (e) further treating the aqueous phase with heat and/or salt (NaCl) to separate the solubilized oil.

15. The method of claim 14 wherein at least one of the surfactants is an ethoxylated $C_{12}$–$C_{18}$ alkyl ammonium salt of a $C_9$–$C_{24}$ alkyl or alkylaryl sulfonic acid containing 6 or more ethylene oxide groups.

16. The method of claim 14 wherein the surfactant(s) are dissolved in up to 50 wt % of a solvent comprised of one or more of a hydrocarbon liquid in which the surfactants are soluble; an oxygenated cosolvent; and less than about 10 wt % water.

17. The method of claim 16 wherein the solvent is a hydrocarbon solvent selected from the group consisting of No. 2 diesel fuel oil, kerosene, and white oil.

18. The method of claim 16 wherein a cosolvent is present and the cosolvent is selected from the group consisting of one or more alkylene glycol monoalkyl ethers and $C_2$ and $C_5$ alcohols.

19. The method of claim 18 wherein the cosolvent is tertiary amyl alcohol and is present in the range of about 10 to about 50 wt % based on the total weight of the solvents employed.

20. The method of claim 14, wherein at least one said surfactants is selected from the group consisting of: an alkali metal, ammonium, alkyl ammonium, alkanol ammonium or ethoxylated alkyl or alkanol ammonium salt of an alkyl or alkylaryl sulfonic acid of the generic formula:

wherein R is an alkyl or alkyl benzene group containing about 8 to about 30 carbon atoms in the alkyl chain and the benzene ring may be additionally substituted with one or two alkyl groups containing 1-3 carbon atoms each, and an ethoxylated surfactant of the generic formula:

$$R_1X(CH_2CH_2O)_nY$$

wherein $R_1$ is an alkyl or mono- or di-alkyl aryl group containing about 8 to about 30 carbon atoms, X is —O—, —S—,

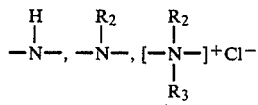

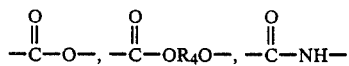

or —SO$_2$NH—; Y is —H, —SO$_3$—M+ or —(-PO$_3$H)$^{-M+}$ wherein M+ is an inorganic on ammonium cation including alkyl substituted ammonium cations; $R_2$ is an alkyl group containing about 1 to about 20 carbon atoms or a polyethoxy ether group containing from about 1 to about 30 (CH$_2$C$_2$O) groups; $R_3$ is H or an alkyl group containing about 1 to about 3 carbon atoms, $R_4$ is a poly hydroxy group derived from glycerol, glycols, sorbitol, or various sugars; and n is an integer from about 1 to about 30.

* * * * *